W. H. FAHRNEY.
VEHICLE WHEEL.
APPLICATION FILED AUG. 20, 1910.
979,269.
Patented Dec. 20, 1910.
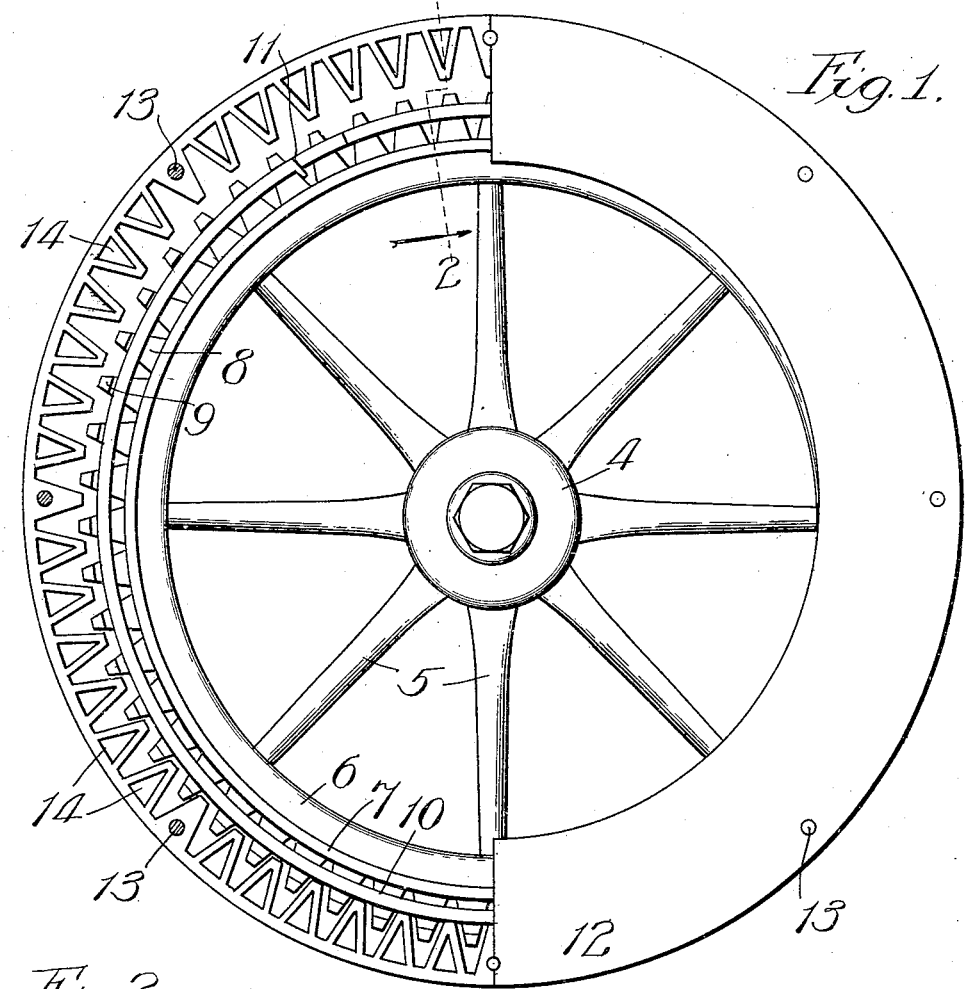
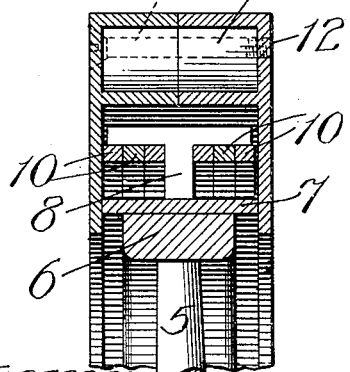
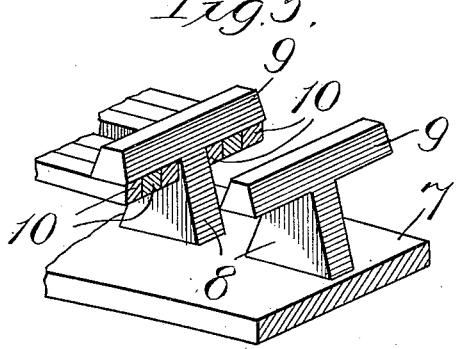
Witnesses:
Inventor:
William H. Fahrney
By Dyrenforth, Lee, Chritton & Wiles
Attys.

UNITED STATES PATENT OFFICE.

WILLIAM H. FAHRNEY, OF CHICAGO, ILLINOIS.

VEHICLE-WHEEL.

979,269.

Specification of Letters Patent. Patented Dec. 20, 1910.

Application filed August 20, 1910. Serial No. 578,117.

*To all whom it may concern:*

Be it known that I, WILLIAM H. FAHRNEY, a citizen of the United States, residing at Chicago, in the county of Cook and State of Illinois, have invented a new and useful Improvement in Vehicle-Wheels, of which the following is a specification.

My invention relates to an improvement in the class of elastic vehicle-wheels, the tire-portions of which are rendered resilient through the medium of springs housed within them; and the object of my improvement is to provide a novel and highly effective construction of vehicle-wheel in the class referred to.

In the accompanying drawing, Figure 1 shows my improved wheel by a view in side elevation, partly sectional; Fig. 2 is a section on the irregular line 2, Fig. 1, and Fig. 3 is a broken perspective view, partly in section, illustrating a preferred construction of the wheel-rim.

Generally stated, my wheel comprises in its construction one or more annular spring-bands confined about the rim-portion in spaced relation thereto, and an annular tire or tread-portion yieldingly confined about the rim to house the bands and provided with projections at intervals about the inner surface of its periphery to engage the bands under the stresses of the load carried by the wheel.

The wheel-center may involve any desired construction, that shown consisting of a hub 4 with spokes 5 radiating from it and carrying the felly 6. Surrounding the felly is a metal rim consisting of a band 7 having radiating from it at intervals projections of the preferred general T-shape illustrated; comprising stems 8 tapering outwardly to meet the sides of the heads 9 centrally thereof, these sides being beveled. Split spring-bands 10 encircle the rim 7, being confined by expansion against the under sides of the heads. Three of these bands are shown to be provided at each side of the circumferential series of the stems 8, and they should be disposed with their split sections in break-joint relation to each other, and be provided each on one end with an inwardly-extending tongue 11 to serve as a handle to facilitate adjustment of the spring in assembling the parts of the wheel. The tire-portion 12 is formed of two similar annular sections fastened rigidly together to meet at the circumferential center of the wheel, as by countersunk screw-bolts 13. On the inner surfaces of these sections are formed radial projections, shown in the preferred form of tapering teeth 14, all of which may be hollow, as represented, for the sake of lightness, except those through which the bolts 13 are passed. Each tooth has one half formed on each section, and the two halves aline with each other to produce the complete tooth. These teeth are disposed in staggered relation to the projections on the rim to register with the spaces between the latter, to which they conform in shape.

In the use of the wheel, the load carried by it causes the tire-portion, where it contacts with the road-bed, to compress the projections 14 at and adjacent to that point against the springs 10, thereby resiliently cushioning the motion of the wheel with resultant ease in riding. As will be seen, the spaced projections 14 act in a stepping manner against the springs with the effect of causing their resilient action to be exerted to the greatest advantage.

What I claim as new, and desire to secure by Letters Patent, is—

1. In an elastic vehicle-wheel, the combination with the wheel-center, of a rim, a tire surrounding the rim to form therewith an interposed annular space and provided with internal projections, and springs confined by expansion in said space but unsupported against inward compression and coöperating with said projections to elastically support the tire.

2. In an elastic vehicle-wheel, the combination with the wheel-center, of a rim provided with spaced projections, a spring-band confined by expansion against said projections about the rim in spaced relation thereto but unsupported throughout its length against inward compression, and an annular tire-portion surrounding the rim and provided with internal projections at intervals registering with the spaces between the projections on the rim to engage the band through said spaces, for the purpose set forth.

3. In an elastic vehicle-wheel the combination with the wheel-center, of a rim provided with headed spaced projections, a split spring-band extending about the rim under the heads of the projections to be confined by expansion against them in spaced relation to the rim but unsupported throughout its length against inward compression, and an annular tire-portion surrounding the rim and provided with internal projections at intervals registering with the spaces between said heads to engage the band through said spaces, for the purpose set forth.

4. In an elastic vehicle-wheel, the combination with the wheel-center, of a rim provided with radially-extending spaced T-shaped projections, split spring-bands extending about the rim under the heads of said projections at opposite sides of their stems to be confined in spaced relation to the rim, and an annular tire-portion surrounding the rim and provided with internal teeth registering with the spaces between said heads to engage the bands through said spaces, for the purpose set forth.

WILLIAM H. FAHRNEY.

In presence of—
A. U. THORIEN,
R. A. SCHAEFER.